(12) United States Patent
Roberson et al.

(10) Patent No.: US 7,594,075 B2
(45) Date of Patent: Sep. 22, 2009

(54) METADATA FOR A GRID BASED DATA STORAGE SYSTEM

(75) Inventors: Randy L. Roberson, New Port Richey, FL (US); Clark Edward Lubbers, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 470 days.

(21) Appl. No.: 10/969,580

(22) Filed: Oct. 20, 2004

(65) Prior Publication Data

US 2006/0085594 A1    Apr. 20, 2006

(51) Int. Cl.
G06F 12/16 (2006.01)

(52) U.S. Cl. .................. 711/114; 711/202

(58) Field of Classification Search .......... None
See application file for complete search history.

(56) References Cited

U.S. PATENT DOCUMENTS

| | | | |
|---|---|---|---|
| 4,847,807 A | 7/1989 | Yule | |
| 5,285,451 A | 2/1994 | Henson et al. | |
| 5,325,363 A | 6/1994 | Lui | |
| 5,412,661 A | 5/1995 | Hao et al. | |
| 5,519,844 A | 5/1996 | Stallmo | |
| 5,537,567 A | 7/1996 | Galbraith et al. | |
| 5,544,339 A | 8/1996 | Baba | |
| 5,568,629 A | 10/1996 | Gentry et al. | |
| 5,632,027 A | 5/1997 | Martin et al. | |
| 5,671,349 A | 9/1997 | Hashemi et al. | |
| 5,682,509 A | 10/1997 | Kabenjian | |
| 5,708,769 A | 1/1998 | Stallmo | |
| 5,729,763 A | 3/1998 | Leshem | |
| 5,774,643 A | 6/1998 | Lubbers et al. | |
| 5,809,516 A * | 9/1998 | Ukai et al. ............ | 711/114 |
| 5,812,754 A | 9/1998 | Lui et al. | |
| 5,812,761 A | 9/1998 | Seki et al. | |
| 5,897,661 A | 4/1999 | Baranovsky et al. | |
| 5,948,110 A | 9/1999 | Hitz et al. | |
| 5,960,169 A | 9/1999 | Stczinski | |
| 5,974,544 A | 10/1999 | Jeffries et al. | |

(Continued)

FOREIGN PATENT DOCUMENTS

WO    WO 2004/046971 A1    6/2004

*Primary Examiner*—Than Nguyen
(74) *Attorney, Agent, or Firm*—Fellers, Snider, et al.

(57) ABSTRACT

Metadata architecture and associated methodology for a data storage system employing a grid-based storage capacity wherein each grid defines a storage unit in terms of a plurality of storage domains along one axis against one or more rows of a plurality of storage stripes along another axis, and wherein a grid grouping of two or more grids defines a sheet of data storage capacity. The metadata comprises identification information stored in a memory space characterizing an allocation status of the sheets in the storage capacity. A method is provided for allocating memory for the grid-based storage capacity comprising determining whether the allocation is associated with an existing logical device. If the determining step is associated with an existing logical device, then a logical device allocation map and a sheet allocation table are accessed to allocate a selected storage unit. Otherwise, a sheet allocation descriptor and a sheet allocation map are accessed to allocate a selected storage unit. A method is provided for transferring data for the grid-based storage capacity comprising accessing a logical device allocation map and a drive organization table to transfer data to or from a selected storage unit.

20 Claims, 15 Drawing Sheets

U.S. PATENT DOCUMENTS

| | | |
|---|---|---|
| 5,983,283 A | 11/1999 | Senator et al. |
| 6,038,570 A | 3/2000 | Hitz et al. |
| 6,078,990 A | 6/2000 | Frazier |
| 6,101,615 A | 8/2000 | Lyons |
| 6,148,369 A | 11/2000 | Ofer et al. |
| 6,154,853 A | 11/2000 | Kedem |
| 6,154,854 A | 11/2000 | Stallmo |
| 6,161,192 A | 12/2000 | Lubbers et al. |
| 6,195,695 B1 | 2/2001 | Cheston et al. |
| 6,219,753 B1 | 4/2001 | Richardson |
| 6,247,157 B1 | 6/2001 | Edirisooriya |
| 6,289,398 B1 | 9/2001 | Stallmo et al. |
| 6,317,844 B1 | 11/2001 | Kleiman |
| 6,327,672 B1 | 12/2001 | Wilner |
| 6,338,126 B1 | 1/2002 | Ohran et al. |
| 6,353,895 B1 | 3/2002 | Stephenson |
| 6,401,214 B1 | 6/2002 | Li |
| 6,425,052 B1 * | 7/2002 | Hashemi .................... 711/114 |
| 6,453,428 B1 | 9/2002 | Stephenson |
| 6,457,140 B1 | 9/2002 | Lindberg et al. |
| 6,473,830 B2 | 10/2002 | Li et al. |
| 6,502,166 B1 | 12/2002 | Cassidy |
| 6,529,994 B1 | 3/2003 | Bleidt et al. |
| 6,529,997 B1 | 3/2003 | Debiez et al. |
| 6,549,981 B2 | 4/2003 | McDonald et al. |
| 6,557,123 B1 | 4/2003 | Wiencko, Jr. et al. |
| 6,574,687 B1 | 6/2003 | Teachout et al. |
| 6,574,754 B1 | 6/2003 | Smith |
| 6,606,638 B1 | 8/2003 | Tarin |
| 6,654,904 B1 | 11/2003 | Andoh et al. |
| 6,675,176 B1 | 1/2004 | Shinkai et al. |
| 6,675,318 B1 | 1/2004 | Lee |
| 6,684,344 B1 | 1/2004 | Kawasaki |
| 6,721,758 B1 | 4/2004 | Jex et al. |
| 6,728,833 B2 | 4/2004 | Pruett et al. |
| 6,742,137 B1 | 5/2004 | Frey, Jr. |
| 6,754,773 B2 | 6/2004 | Ulrich et al. |
| 6,775,674 B1 | 8/2004 | Agassi et al. |
| 2002/0069324 A1 | 6/2002 | Gerasimov et al. |
| 2002/0078239 A1 | 6/2002 | Howard et al. |
| 2002/0156840 A1 * | 10/2002 | Ulrich et al. ................ 709/203 |
| 2002/0166026 A1 | 11/2002 | Ulrich et al. |
| 2002/0178162 A1 | 11/2002 | Ulrich et al. |
| 2002/0191311 A1 | 12/2002 | Ulrich et al. |
| 2004/0133606 A1 | 7/2004 | Miloushev et al. |
| 2004/0133607 A1 | 7/2004 | Miloushev et al. |
| 2004/0210591 A1 | 10/2004 | Hirschfeld et al. |

* cited by examiner

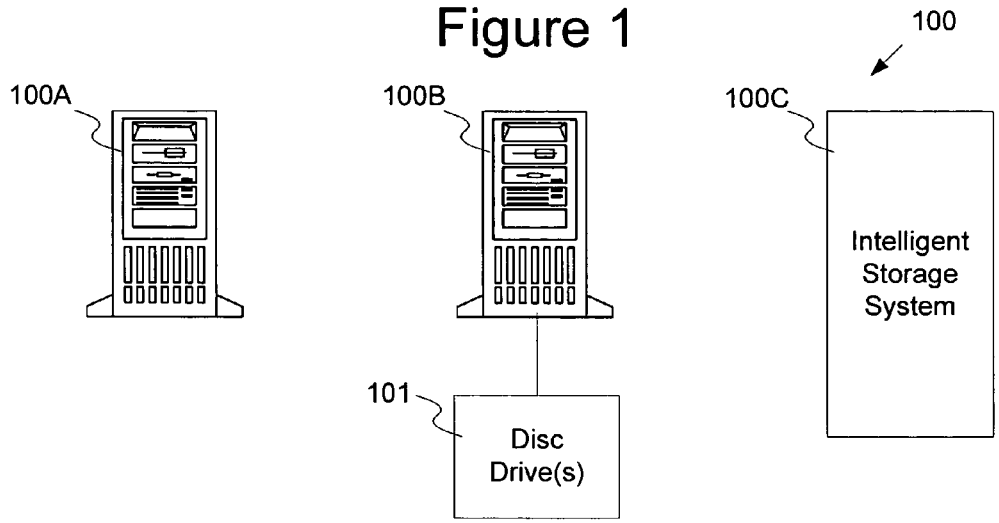
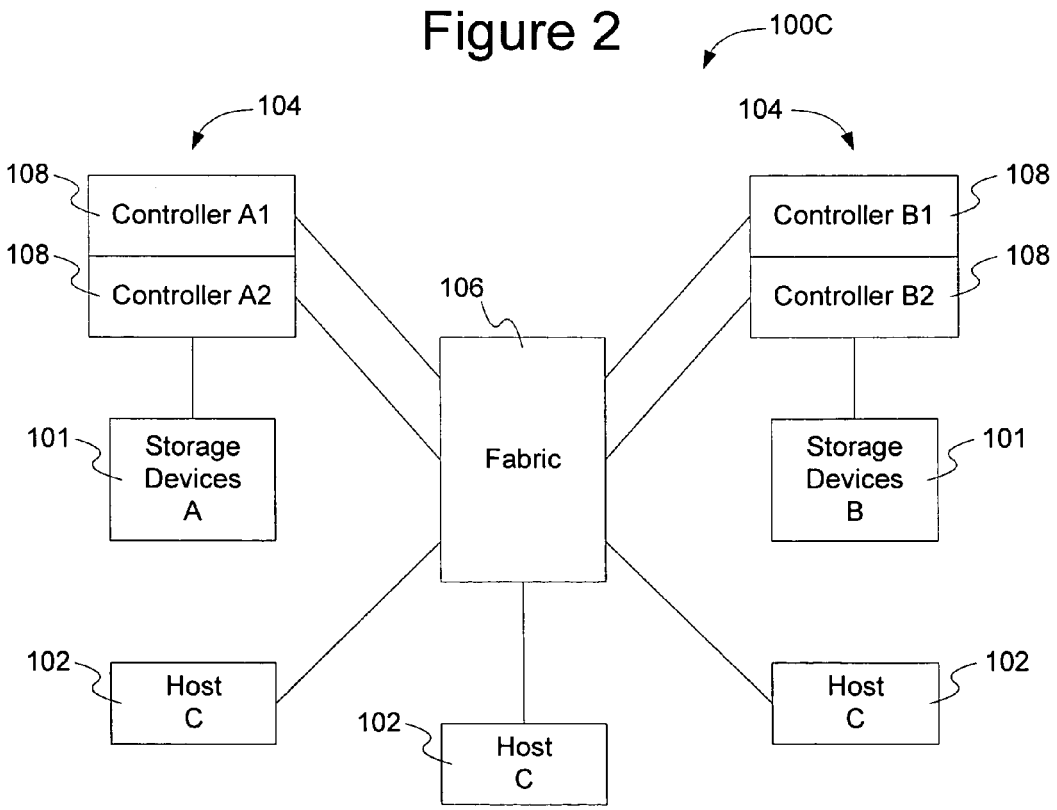

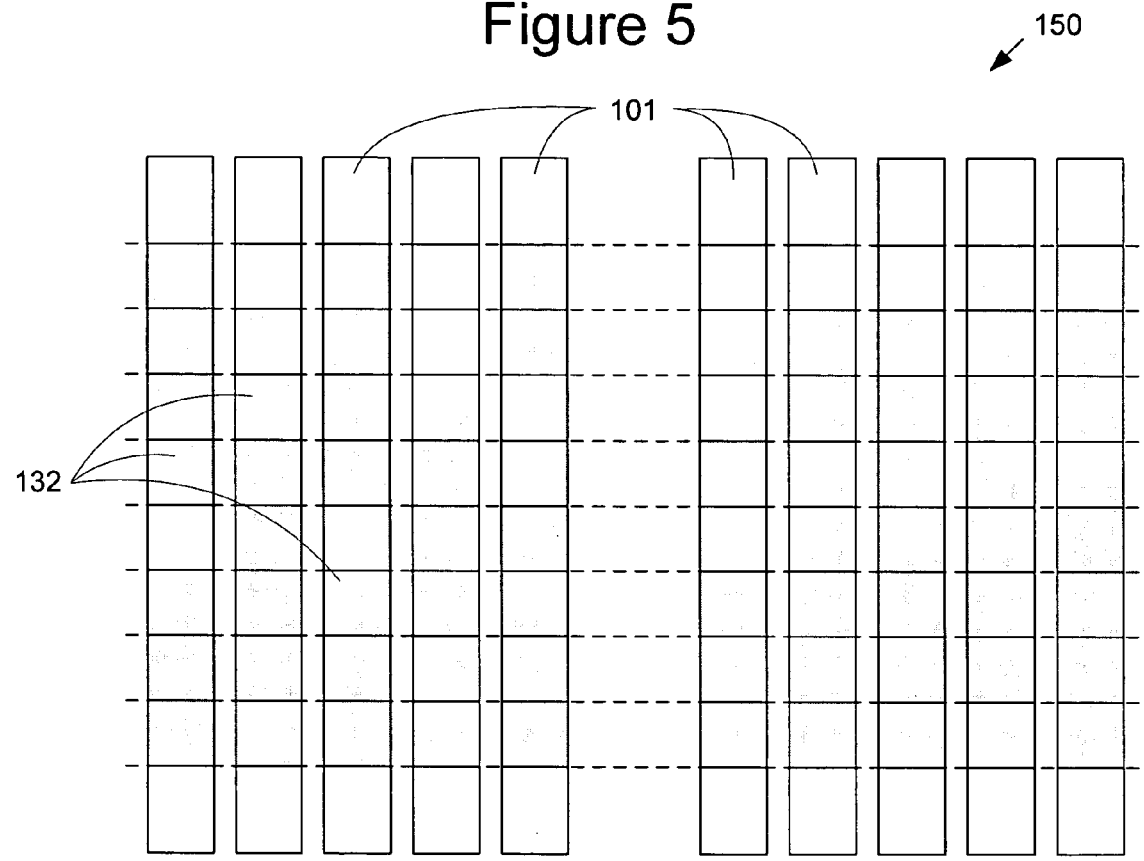

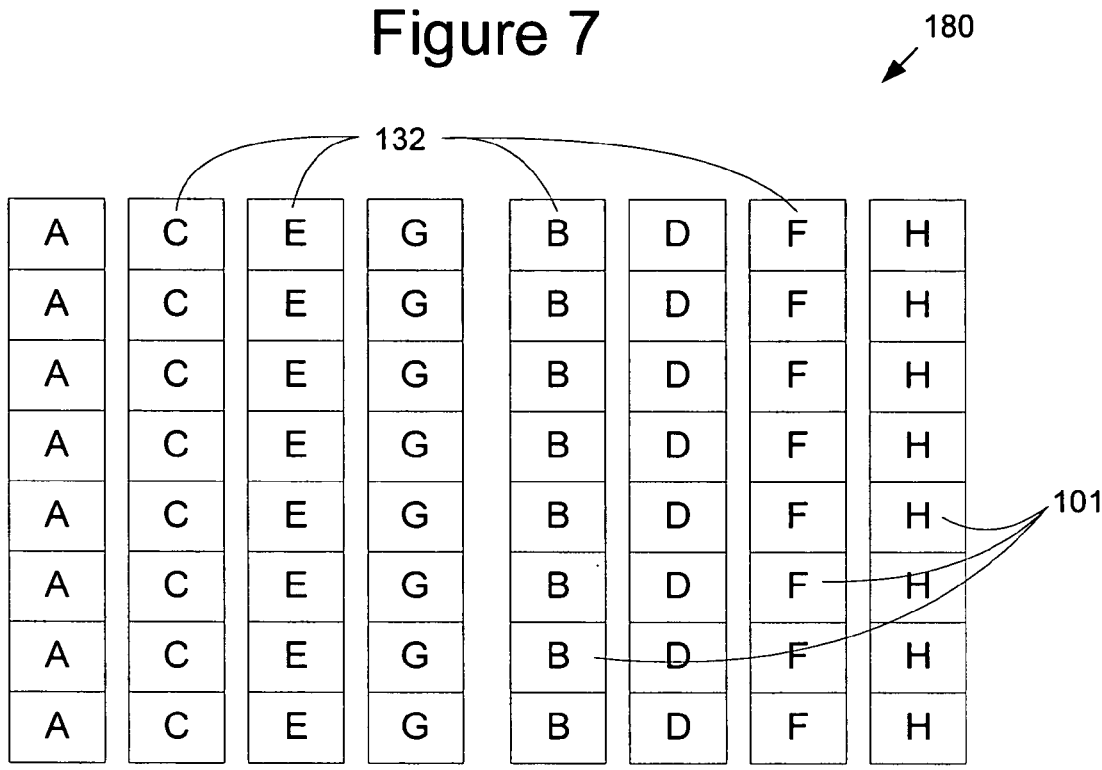

| Data P-1 | Data P-2 | Data P-3 | Data P-4 | Data H-1 | Data H-2 | Data H-3 | Data H-4 |
|---|---|---|---|---|---|---|---|
| Data O-1 | Data O-2 | Data O-3 | Data O-4 | Data G-1 | Data G-2 | Data G-3 | Data G-4 |
| Data N-1 | Data N-2 | Data N-3 | Data N-4 | Data F-1 | Data F-2 | Data F-3 | Data F-4 |
| Data M-1 | Data M-2 | Data M-3 | Data M-4 | Data E-1 | Data E-2 | Data E-3 | Data E-4 |
| Data L-1 | Data L-2 | Data L-3 | Data L-4 | Data D-1 | Data D-2 | Data D-3 | Data D-4 |
| Data K-1 | Data K-2 | Data K-3 | Data K-4 | Data C-1 | Data C-2 | Data C-3 | Data C-4 |
| Data J-1 | Data J-2 | Data J-3 | Data J-4 | Data B-1 | Data B-2 | Data B-3 | Data B-4 |
| Data I-1 | Data I-2 | Data I-3 | Data I-4 | Data A-1 | Data A-2 | Data A-3 | Data A-4 |

METADATA FOR A GRID BASED DATA STORAGE SYSTEM

FIELD OF THE INVENTION

The embodiments of the present invention relate generally to computer systems storage capacity and more particularly, but without limitation, to metadata architecture describing the configuration of allocated memory in the storage capacity.

BACKGROUND

Computer systems comprise input devices, output devices, one or more central processing units (CPUs), and storage capacity. The storage capacity takes form in many data storage devices, such as semiconductor memory, disc drives, and optical drives. An operating system provides an application environment and a file system that allocates or de-allocates storage capacity as files are created, modified, or deleted. Data storage systems such as servers also employ a file system for allocating storage capacity that is accessed through a network or other connection. Servers and storage arrays support data storage formats such as a redundant array of independent drives (RAID) that distributes stored information across a plurality of data storage devices. Data structures containing information describing the manner in which the data are mapped to memory is termed metadata. As files are created, modified, or deleted, metadata is updated to reflect the allocation or de-allocation (sometimes referred to collectively as "allocation") of storage capacity.

The structure of metadata can significantly impact storage system performance. As the storage capacity of a system grows, the amount of metadata employed to manage the system also grows. As data structures using metadata become larger, the amount of time needed to parse information from the structures and to update these structures becomes significant.

SUMMARY OF THE INVENTION

As embodied herein and as claimed below, the embodiments of the present invention are generally directed to an apparatus and associated method for describing computer system configuration information.

Some embodiments of the present invention are directed to metadata for a data storage system employing a grid-based storage capacity wherein each grid defines a storage unit in terms of a plurality of storage domains along one axis against one or more rows of a plurality of storage stripes along another axis, and wherein a grid grouping of two or more grids defines a sheet of data storage capacity. The metadata comprises identification information stored in a memory space characterizing an allocation status of the sheets in the storage system.

In other embodiments of the present invention a method is provided for allocating memory for the grid-based data storage system comprising determining whether the allocation is associated with an existing logical device. If the determining step is associated with an existing logical device, then a logical device allocation map and a sheet allocation table are accessed to allocate a selected storage unit. Otherwise, a sheet allocation descriptor and a sheet allocation map are accessed to allocate a selected storage unit.

In other embodiments of the present invention a method is provided for transferring data for the grid-based data storage system comprising accessing a logical device allocation map and a drive organization table to transfer data to or from a selected storage unit.

BRIEF DESCRIPTION OF THE DRAWINGS

FIG. 1 is a diagrammatical depiction of exemplary operating systems in which various embodiments of the present invention can be employed.

FIG. 2 is a top level functional block depiction of a computer-based system characterized as a wide-area network utilizing mass storage.

FIG. 5 is a diagrammatical depiction of a grid-based data storage capacity.

FIG. 6 is a diagrammatical depiction of a sheet organization table for data storage sheets employing ten drives in the grid.

FIG. 7 is a diagrammatical depiction of a data capacity grid.

FIG. 8 is a diagrammatical depiction of a user data grid.

FIG. 9 is a diagrammatical depiction of a RAID 1 mirror data grid for the user data grid of FIG. 8.

FIG. 10 is a diagrammatical depiction of a user/parity grid adapted for RAID 5 and RAID 6 levels.

DETAILED DESCRIPTION

Figure 3:
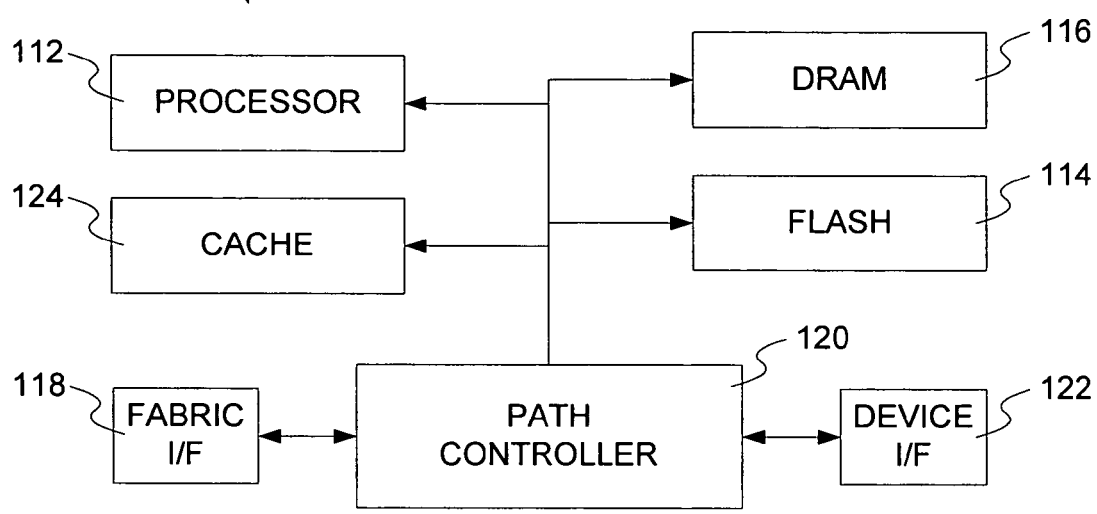
FIG. 3 provides a functional block diagram illustrating a selected one of the controllers of FIG. 2.

FIG. 1 depicts exemplary operating systems in which embodiments of the present invention can be employed, such as in a computer 100A, or in a server 100B with internal or attached data storage devices 101, or in an intelligent storage system 100C. Intelligent storage system 100C is representative of storage systems that can have intelligent controllers and interfaces and that can have one or more data storage arrays.

Operating systems 100 each contain at least one central processing unit (CPU), a plurality of data storage devices 101 defining a data storage capacity, and metadata describing the configuration of the data storage capacity. By "configuration" it is meant that a description is provided to the system 100 regarding whether particular portions of the storage capacity are being used to store data, or "allocated" space, as opposed to the portions that are available for storing data, or "allocatable" space.

Other operating systems suited for use with various embodiments of the present invention include additional data storage devices 101, additional data storage arrays, additional data storage device controllers or network interface controllers, and the like, that are not depicted in FIG. 1. For example, embodiments of the present invention can be used in a system 100 that includes at least two data storage devices 101 and one controller. Embodiments of the present invention can be employed in simple systems having little or no fault tolerance redundancy to highly redundant systems having no single point of failure.

To illustrate an exemplary environment in which presently preferred embodiments of the present invention can be advantageously practiced, FIG. 2 shows a computer-based system 100C characterized as a wide area network (WAN) utilizing mass storage.

The system 100C includes a number of host computers 102, respectively identified as hosts A, B, and C. The host computers 102 interact with each other as well as with a pair of data storage arrays 104 (denoted A and B, respectively) via a fabric 106. The fabric 106 is preferably characterized as fibre-channel based switching network, although other configurations can be utilized as well including the Internet.

Each array 104 includes a pair of controllers 108 (denoted A1, A2 and B1, B2) and a set of data storage devices 101 preferably characterized as disc drives operated as a RAID. The controllers 108 and data storage devices 101 preferably utilize a fault tolerant arrangement so that the various controllers 108 utilize parallel, redundant links and at least some of the user data stored by the system 100C is stored in a redundant format within at least one set of the data storage devices 101.

It is further contemplated that the A host computer 102 and the A data storage array 104 can be physically located at a first site, the B host computer 102 and B storage array 104 can be physically located at a second site, and the C host computer 102 can be yet at a third site, although such is merely illustrative and not limiting.

FIG. 3 illustrates a selected one of the controllers 108 in greater detail. The controller 108 can be embodied in a single integrated circuit, or distributed among a number of discrete circuits as desired. A main processor 112, preferably characterized as a programmable, computer processor, provides control in accordance with programming steps and processing data preferably stored in non-volatile memory 114 (such as flash memory or similar) and in dynamic random access memory (DRAM) 116.

A fabric interface (I/F) circuit 118 communicates with the other controllers 108 and the host computers 102 via the fabric 106, and a device I/F circuit 120 communicates with the storage devices 101. The I/F circuits 118, 122 and a path controller 120 form a communication path to pass commands and data between the storage array 104 and the host 102, such as by employing the cache memory 124. Although illustrated discretely, it will be understood that the path controller 120 and the I/F circuits 118, 122 can be unitarily constructed.

The data storage capacity of an array 104, defined by the extent of the data storage devices 101 in a given array 104, is organized into logical units ("LUNs") that can be written to and read from the array 104. System configuration information defines the relationship between user data, including any associated parity and mirror data, with the respective storage locations. The system configuration furthermore identifies the relationship between blocks of storage capacity allocated to user data and the memory storage locations, such as logical block addresses (LBA). The system configuration can furthermore include virtualization by defining virtual block addresses that are mapped to logical block addresses.

System configuration information is changed when storage capacity is allocated, such as when saving new files or enlarging existing files, or after storage capacity is deallocated, such as when deleting files or reducing the size of existing files. System metadata defines file allocation information and other data structures that support allocation processes.

Figure 4:
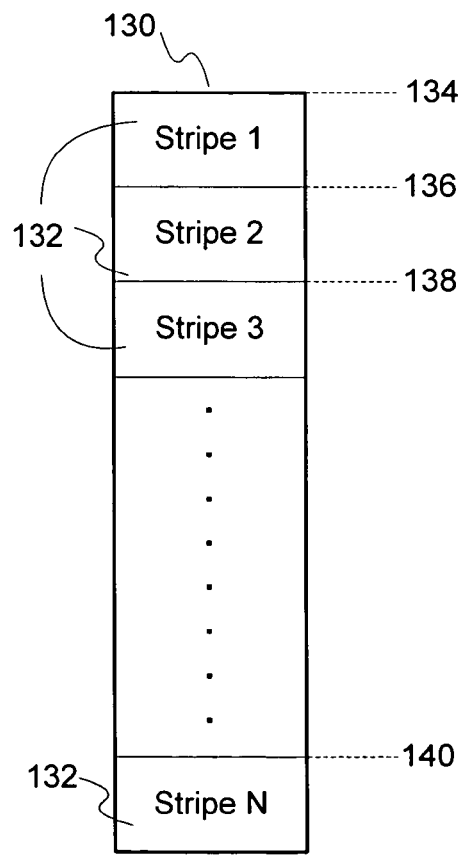
FIG. 4 is a diagrammatical depiction of a data storage device memory.

FIG. 4 is a diagrammatical representation of an overview in terms of a storage map 130 showing a portion of the storage capacity contained in the data storage device 101 (FIG. 1). In the following description, "stripe" is used in a generic sense, and not only in terms of a RAID stripe as defined by the RAID Advisory Board (RAB). The storage map 130 depicts stripes 132 (sometimes referred to herein as "sub partitions" 132), each containing a predefined portion of the storage capacity. The amount of storage capacity in stripes 132 can reflect the type of storage applications of the system. Each stripe 132 starts at an LBA. For purposes of illustration, stripe 1 begins at LBA 134, stripe 2 begins at LBA 136, and stripe 3 begins at LBA 138. A plurality of other stripes 132 can be defined up to Stripe N that begins at LBA 140. Preferably, the end of one stripe 132 is immediately adjacent the next stripe 132 so that there is no unused storage capacity between adjacent stripes 132.

FIG. 5 depicts a grid 150 based storage capacity arrangement for the system 100C. Each column in the grid 150 corresponds to one data storage device 101, or storage domain, and each row in the grid 150 corresponds to a plurality of stripes 132, with one stripe 132 in each data storage device drive 101. Stripes 132 in one row can start at the same or at different LBAs.

Spare capacity is distributed across sub-partitions of data storage device 101 partitions. Accordingly, stripes 132 can be allocated to store data or can be spares. Stripes 132 containing data store such things as user information, mirror data, or parity data. Spare stripes 132 can be configured to exist only on specific data storage devices 101, or can be distributed across some or all data storage devices 101 in a predetermined manner. The designation of spare stripes 132 can vary from one grid 150 to the next. A group of consecutive grids 150 is termed a sheet, and is sometimes referred to as a grid group. The sub-partitions align with the sheets, and are termed "sheet cells" ("scells"). The data storage devices 101 employed to form a grid 150 is termed a book.

FIG. 6 depicts a sheet organization table 160 having sheet versions 162, 164, 166, 168, and 170, for sheets employing grids 150 with ten data storage devices 101 (consecutively denoted A, C, E, G, I, B, D, F, H, and J) and with a spare capacity of two data storage devices 101 that is distributed across all the data storage devices 101. The sheet organization table 160 defines sheet organization versions 172, denoting which data storage devices 101 are spares (as indicated by the letter "s") and which data storage devices 101 contain data (as indicated by the letter "d"). It will be noted that preferably the arrangement of data and spare scells changes for each different sheet version 172. This allows data stripes 132 and spare stripes 132 to be distributed across all of the data storage devices 101 within the book, such that all of the data storage devices 101 can be simultaneously accessing data in a multi-threaded environment. Such a sparing arrangement offers higher performance than systems 100 where all spare stripes 132 are contained in less than all the data storage devices 101.

In the illustrative embodiments shown wherein two or more data storage devices 101 provide spare capacity for each of the versions 172, data storage devices 101 can be configured into groups and pairs. In table 160, for example, drives A&B, C&D, E&F, G&H, and I&J form pairs, and sparing can be allocated such that data stripes 132 contained in the pair have the same designation, either spare or data, for each sheet version 172. Data storage devices 101 can also be organized into groups. In table 160, for example, a first group 174 contains drives A, C, E, G, and I, and a second group 176 contains drives B, D, F, H and J. Pairing can be employed for RAID 1 data formats such that one member of the pair contains user data (primary data) and the other member of the pair contains an identical copy in the form of mirror data (secondary data) or vice-versa. Grouping can also be employed for RAID 5 data formats such that user data is stored in one group 174, 176 and parity data is stored in the other group 176, 174. As such, pairing and grouping of data storage devices 101 is advantageously employed when configuring fault tolerant data storage formats. The pairing and grouping of FIG. 6 is exemplary and there is no constraint as to which data storage devices 101 form pairs or groups, but a given data storage device 101 (all partitions thereof) is always paired with one and only one particular other data storage device 101 for maximum fault tolerance.

If a data storage device 101 fails, data from functioning data storage devices 101 are copied or reconstructed and written to spare stripes 132, as is specified by the sheet organization table 160. In the illustrative embodiments of FIG. 6, the sheet organization table 160 can be a circular table that repetitively cycles through a set of spare versions (drive organization) 172. For example, a sixth sheet (not shown) could be referenced by the same sheet version 162 as the first sheet but be referenced by a different spare version 172 (drive organization). Sheet organization table 160 can be modified to support a different number of versions 172, data storage devices 101, and spare configurations.

The application of the sheet organization table 160 to the grid 150 (FIG. 5) provides a first set of stripes 132 in a sub partition being designated as spare stripes 132 and a second set of stripes 132 in a sub partition that can store user data, mirror data, or parity data. This combination of the sheet organization table 160 (SV1 162) and the grid 150 defines an allocatable storage grid, sometimes referred to herein as "storage unit" (SU) 180, as shown illustratively in FIG. 7. Each rectangle represents a data stripe 132, and the letter within each rectangle indicates the associated data storage device 101. The SU 180 comprises eight rows spanning eight data storage devices 101. For example, if a stripe 132 size of 128 KB is specified, the SU 180 provides 8 MB of storage capacity. Such SUs 180 within a book can be sequentially numbered or otherwise each assigned a number or a unique identifier.

As noted previously, a plurality of grids 150 can be organized into a sheet. Sheets are typically configured in only one storage format, but during some operations, such as RAID level conversion, more than one storage format can exist within a sheet.

FIG. 8 depicts a storage unit (SU) 185 which is similar to the SU 180 but with all stripes 132 containing user data, and which are denoted Data A-1, Data A-2, Data A-3, Data A-4, Data B-1, etc. up to Data P-4. Fault tolerance can be provided for data stored in SU 185 through redundant information, such as parity data or mirror data, which is stored in other SUs 180. An SU 185 that is associated with fault tolerance information contained in one or more other SUs 180 is termed a "reliable storage unit" (RSU). For purposes of this description and the appended claims, the term "SU" contemplates a preselected user data storage capacity with or without associated fault tolerance information. That is, the term "SU" can mean an SU 185 containing user data without any associated fault tolerance information, and the term "SU" can in equivalent alternative embodiments mean an RSU.

FIG. 9 depicts an illustrative RAID 1 mirror data grid 190 of the SU 185 in FIG. 8. Data from the left side of SU 185 is mirrored in the right side of mirror data grid 190, creating RAID 1 pairs. That is, for each stripe 132 in SU 185 there is a corresponding stripe 132 in mirror data grid 190. For example, stripe A-1 in mirror data grid 190 is mirrored with respect to stripe A-1 in SU 185. It will be noted that the mirrored data is stored in a different data storage device 101 as required for data fault tolerance.

Figure 10:
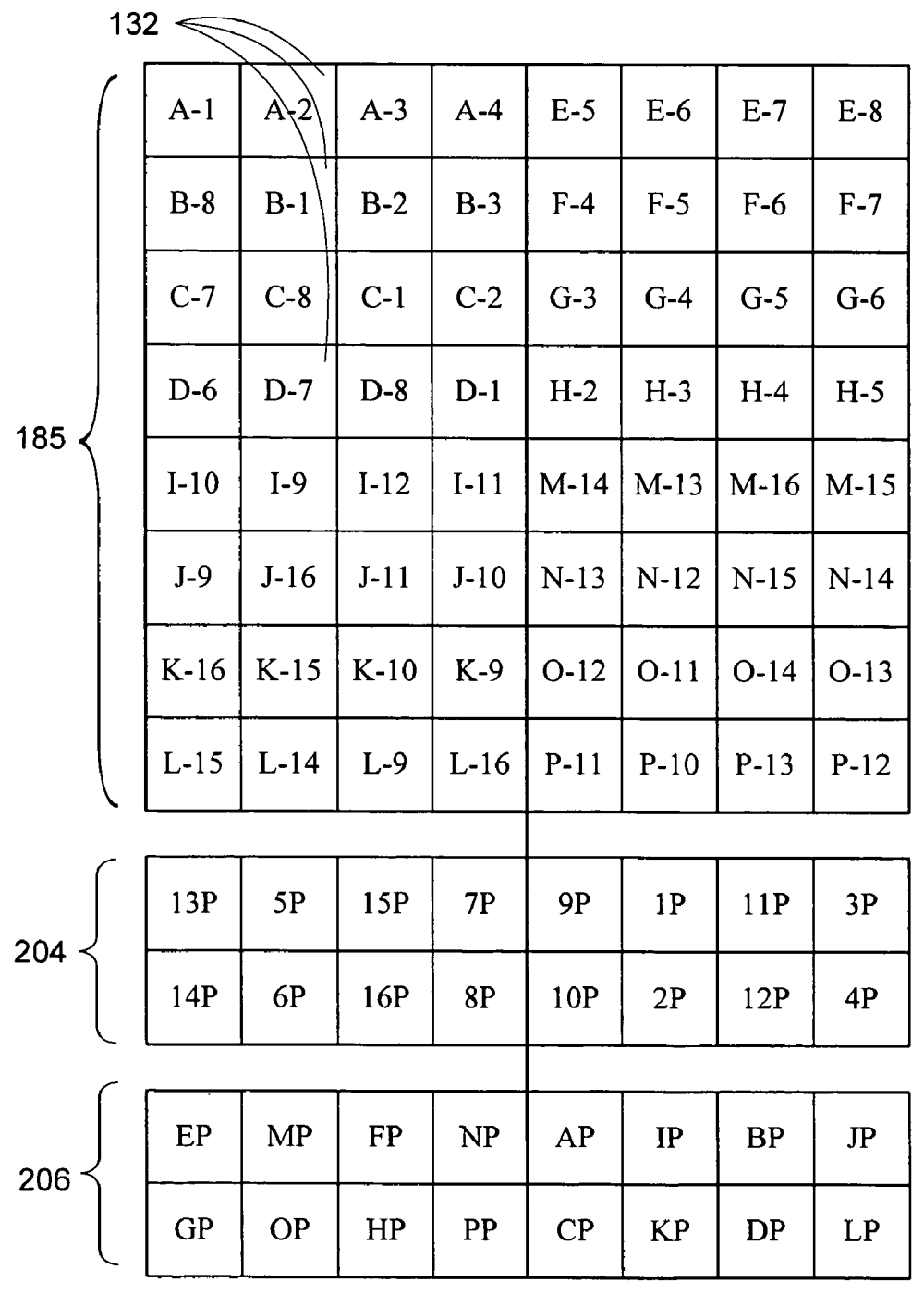

FIG. 10 depicts an SU 185 and a manner for calculating and placing column and row parity values 204, 206. SU 185 is like that of FIG. 8, with each stripe 132 in the SU 185 labeled with a letter index and a number index. Letter indices specify row parity stripe sets for RAID 5 that are used to generate the row parity stripes 206. For example, user data stripes A-1, A-2, A-3 and A-4 can be XOR'ed (logically exclusive OR'ed) to produce stripe "AP" in row parity values 206. The number indices specify column parity stripe sets employed to generate diagonal parity for RAID 6 data storage formats. For example, user data stripes A-1, B-1, C-1 and D-1 can be XOR'ed to produce "1 P" in column parity values 204. The eight rows and columns of the SU 185 are used to generate two rows of row parity data 206 and two rows of column parity data 204. For optimal performance the fault tolerance information is not contained within the SU 185 but rather in one or more other SUs 180. Preferably, the parity values 204, 206 could be contained within two different SUs 180 to facilitate RAID format transformation.

Figure 11:
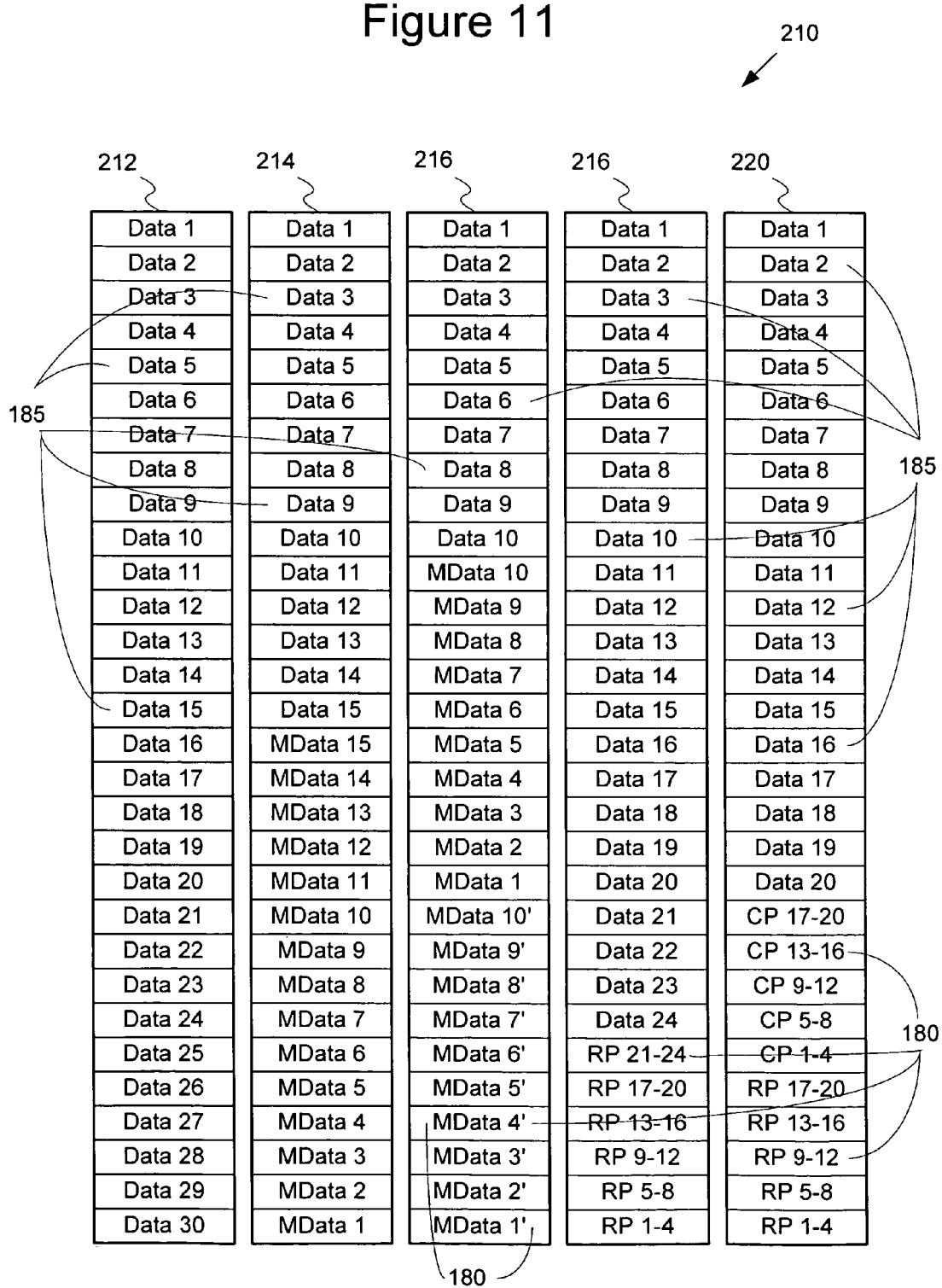
FIG. 11 is a diagrammatical depiction of grid utilization for various RAID levels.

FIG. 11 depicts a grid utilization chart 210 for sheets 212, 214, 216, 218, and 220, each employing a total of 30 grids consisting of SUs 185 or grids 180 and configured according to RAID 0, RAID 1×2, RAID 1×3, RAID 5, and RAID 6, respectively. For RAID 0 (212) the sheet contains 30 SUs 185, labeled Data 1-30. For RAID 1×2 (214) fifteen SUs 185 contain user data, labeled Data 1-15, and fifteen grids 180 contain mirror data, labeled MData 1-15. For RAID 1×3 (216) ten SUs 185 contain user data labeled Data 1-10, ten grids 180 contain mirror data, labeled Mdata 1-10, and ten grids 180 contain alternate mirror data labeled Mdata 1'-10'. Alternate mirror data employs a different ordering of stripes within the grid utilization chart 210 than the mirror data, while maintaining the user data, mirror data, and alternate mirror data as being stored in different data storage devices 101. For RAID 5 (218) 24 SUs 185 contain user data, labeled as Data 1-24, and six grids 180 contain row parity, labeled RP1-4 to RP21-24. For RAID 6 (220), 20 SUs 185 contain user data, labeled as Data 1-20, five grids 180 contain row parity labeled RP 1-4 to RP 17-20, and five grids 180 contain column parity, labeled CP1-4 to CP 17-20.

These configurations illustrate a "packed parity" format where user data is stored exclusively in one portion of a sheet and mirror or parity data (if any) is stored in another portion of the sheet. This provides increased sequential read performance. For the illustrative configuration of FIG. 11 having a combined total arrangement of 30 SUs 185 or grids 180 per sheet, different RAID levels result in different numbers of SUs 185:

| RAID Level | Number of SUs |
|---|---|
| RAID-0 | 30 |
| RAID-1 | 15 |
| RAID-1 × 3 | 10 |

-continued

| RAID Level | Number of SUs |
|---|---|
| RAID-5 | 24 |
| RAID-6 | 20 |

Figure 12:
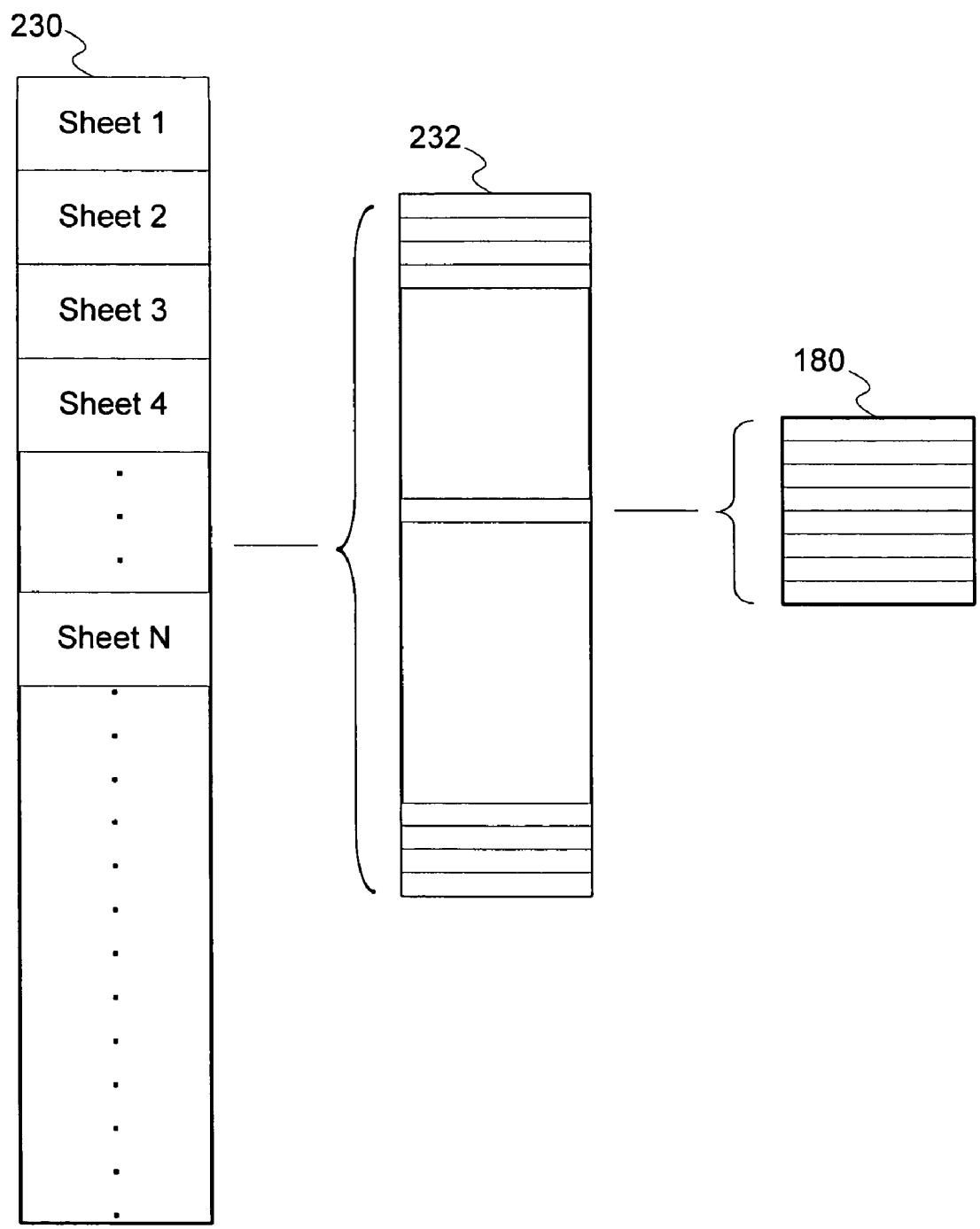
FIG. 12 is a diagrammatical depiction of data sheet capacity hierarchy.

FIG. 12 is a diagrammatic block diagram of a grid-based architecture that is well suited for mapping storage capacity in accordance with embodiments of the present invention. Shown in FIG. 12 is a map 230 of a plurality of numbered sheets, one of the sheets 232, and a grid 180. As described previously, grid 180 can serve as an SU 185 or can contain mirror data or parity data.

Again, the term "metadata" is used to describe the system 100 configuration that is useful in describing the present arrangement of the storage capacity for efficient management and manipulation of the data. Metadata can be stored on disc and/or in non-disc memory, such as in cache memory, for example. Portions of metadata stored on disc may also be stored in non-disc memory. Metadata can furthermore be associated with a logical device, such as a logical disc.

Figure 13:
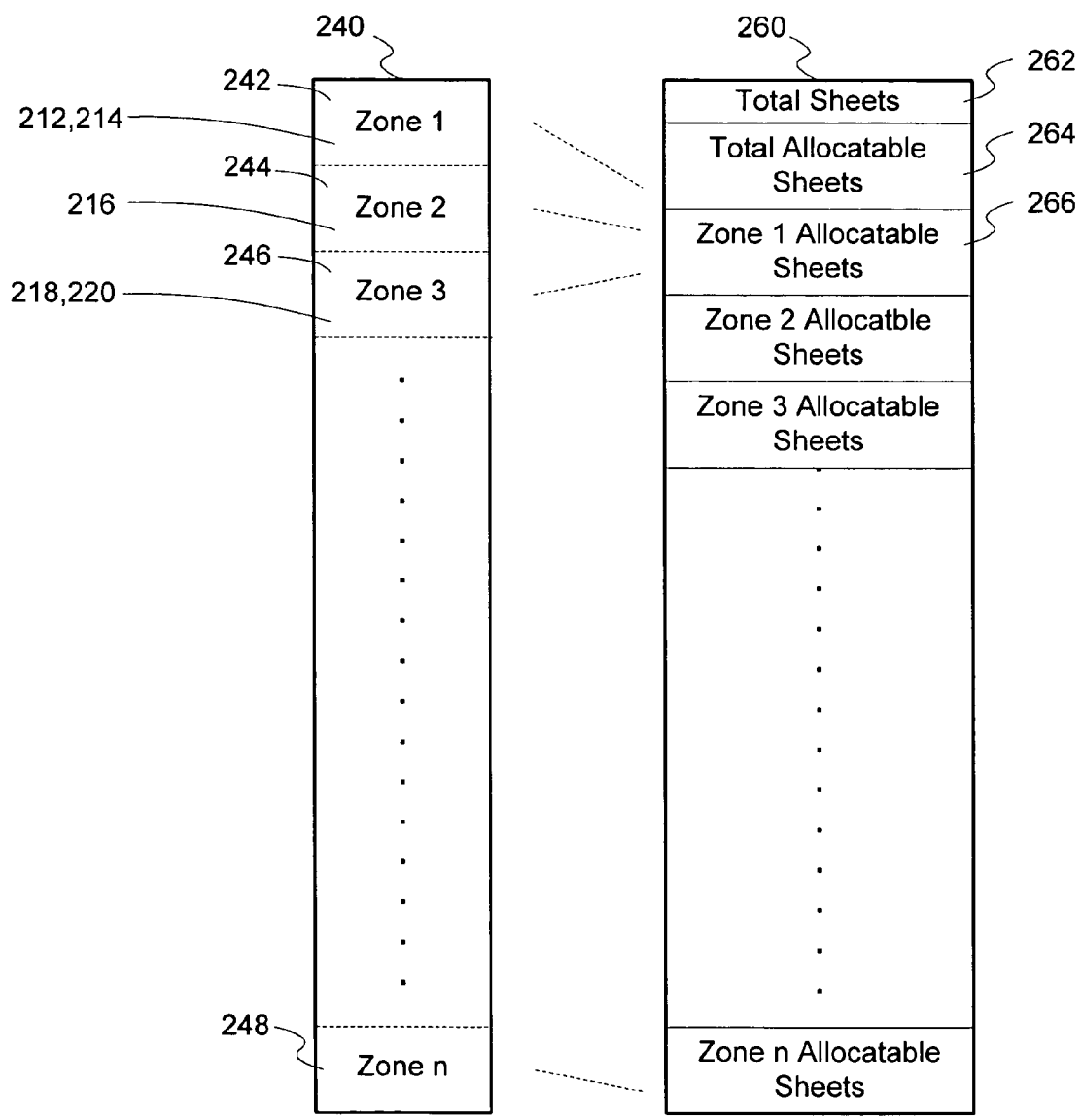
FIG. 13 is a diagrammatical depiction of a sheet allocation map and a sheet allocation descriptor.

FIG. 13 depicts metadata in accordance with embodiments of the present invention. A sheet allocation map (SAM) 240 is a bit array having a bit for each sheet in the book. Bits in the SAM 240 are set to a first value if corresponding sheets have been allocated, and are set to a second value if corresponding sheets are allocatable. Accordingly, the SAM 240 can be used to identify allocatable sheets. The SAM 240 is shown organized into a plurality of zones 242, 244, 246, and 248, with a preselected number of sheets per zone. That is, in the illustrative embodiments of FIG. 13, sheets 212, 214 are in zone 1 (242), sheet 216 is in zone 2 (244), and sheets 218, 220 are in zone 3 (246).

The metadata further comprises a sheet allocation descriptor (SAD) 260 providing summary information about the state of the SAM 240. The SAD 260 comprises a total number of sheets 262, the number allocatable sheets 264, and an array containing the number of allocatable sheets within the zones of the SAM 240. For example, Zone 1 allocatable sheets 266 of the SAD 260 contain the number of allocatable sheets in Zone 1 (242) of the SAM 240. Some embodiments of the present invention employ one SAM 240 and one SAD 260 for each book. Alternative embodiments of the present invention employ a single SAM 240 for a plurality of books, or can comprise multiple SAMs 240 with each SAM 240 covering a portion of a book or books. The SAD 260 simplifies identification of storage areas having allocatable sheets or a predetermined number of allocatable sheets.

Figure 14:
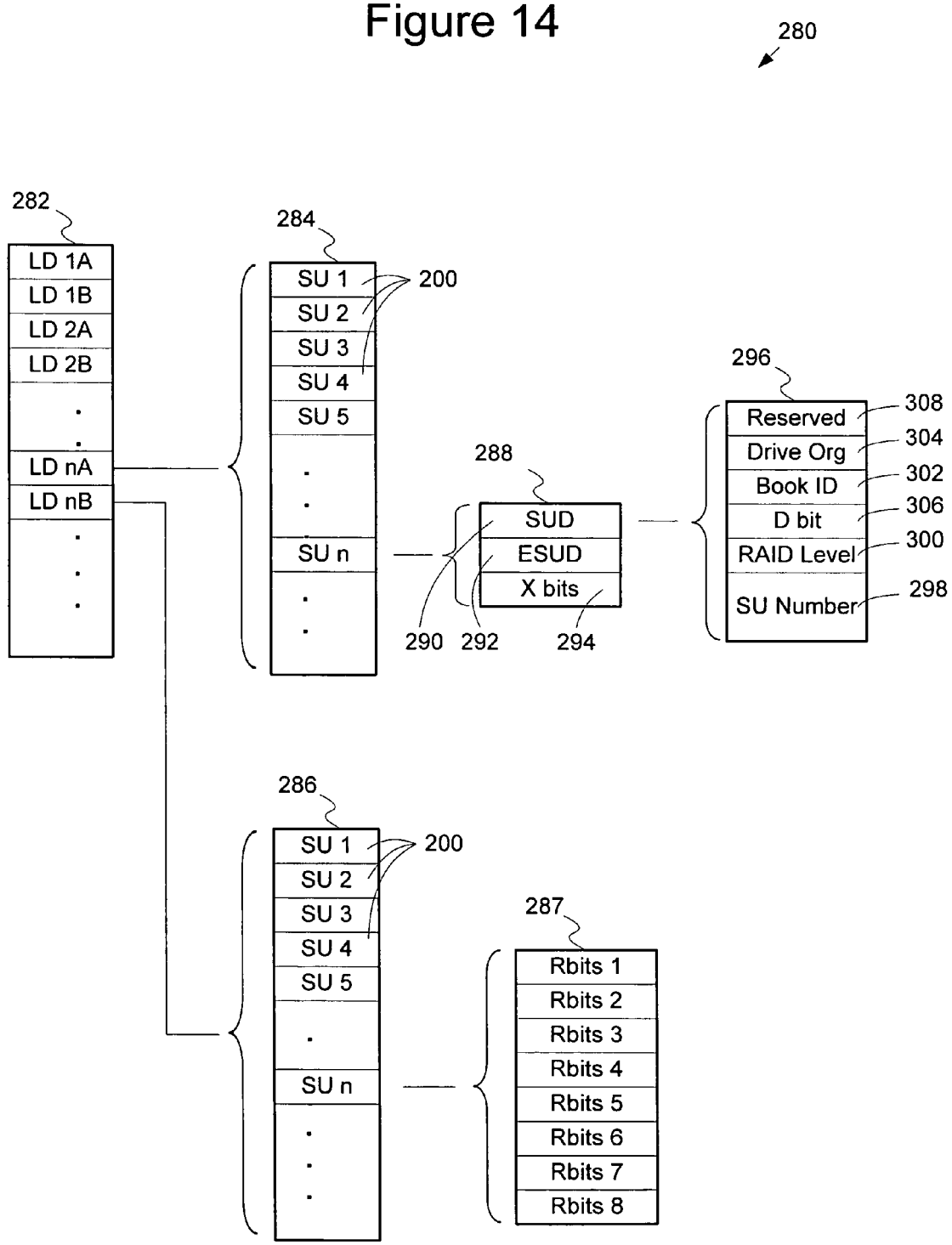
FIG. 14 is a diagrammatical depiction of a logical device allocation map.

As discussed previously, sheets can be allocated to a logical device (LD). FIG. 14 further depicts metadata of the present embodiments in the form of a logical device allocation map (LDAM) 280, which has an array of pointer pairs 282. A first pointer points to a SU descriptor array 284, and a second pointer points to an R-bit Array (RBA) 286. An entry 288 comprises a SU descriptor 290, an extended SU descriptor 292, and X-bits 294. The X-bits 294 can be employed to indicate whether a portion of the SU 185 has been written. The SU descriptor 290 comprises fields 296 that comprise the SU number 298, the RAID level 300, the book ID 302, the drive organization 304, a D-bit 306, and reserved bits 308.

The SU number 298 and book ID 302 define a particular SU 185 in the storage capacity. The sheet version 172 (FIG. 6) of the sheet containing a particular SU 185 can be determined by dividing the SU number 298 by the number of grids 180 in a sheet (such as by 30 in the example of FIG. 11) then dividing the result by the number of sheet organization versions (such as 5 in the example of FIG. 6) with the remainder being the sheet version. The D-bit 306 is employed to indicate media validity. The extended SU descriptor 292 provides additional SU 185 number bits where needed for large capacity data storage devices 101. Each RBA entry 287 contains Rbits used to indicate status information for subsets of the SU 185. The Rbits can be used, for example, to indicate data currency.

Through allocation of sheets and SUs 185 to LDs, logical block addresses (LBAs) of stripes 132 are virtualized as virtual block addresses (VBAs) within each LD. Restated, the SU descriptor 290 (and the extended SU descriptor 292 where applicable) maps the smallest unit of storage that can be allocated to a given LD. The LBAs of the blocks in the SU 185 are determined in part through the SU number 298, as is described further below. The LDAM 280 structure depicted in FIG. 14 is preferably indexed by LD or some other hierarchical structure in order to access the SU descriptor array 284 and RBA 286 or a portion thereof for a particular LD. This provides flexibility and memory usage efficiency when allocating LDs that range from a small number of SUs 185 to a large number of SUs 185. Alternatively, some embodiments of the present invention employ a "flat" structure where the SU descriptor array 284 and the RBA 286 for each LD are stored consecutively in a single array.

Figure 15:
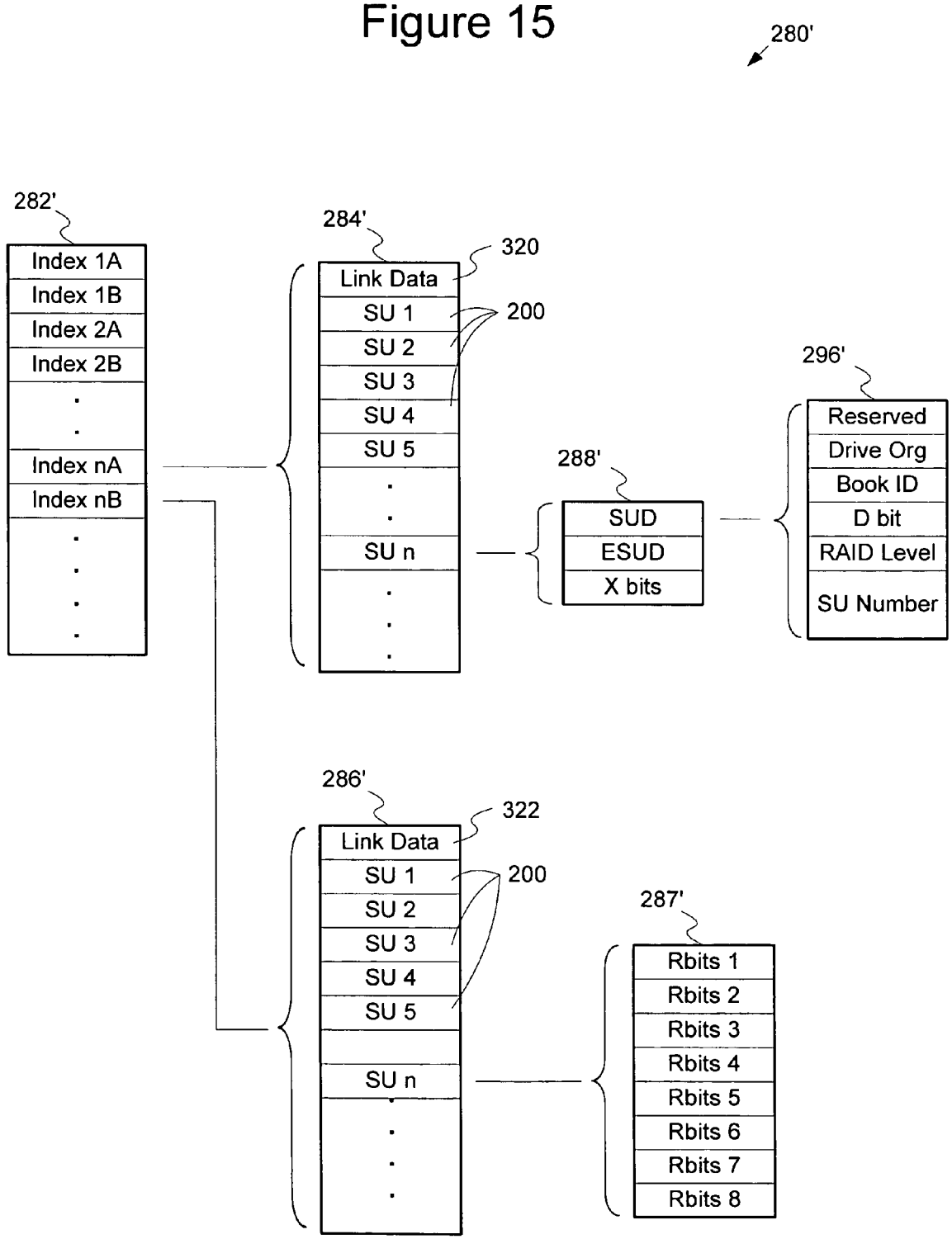
FIG. 15 is a diagrammatical depiction of a link listed logical device allocation map.

FIG. 15 depicts an illustrative link listed LDAM 280' structure including link data 320, 322 providing linkage of the SU descriptor array 284' and the RBA 286'.

Figure 16:
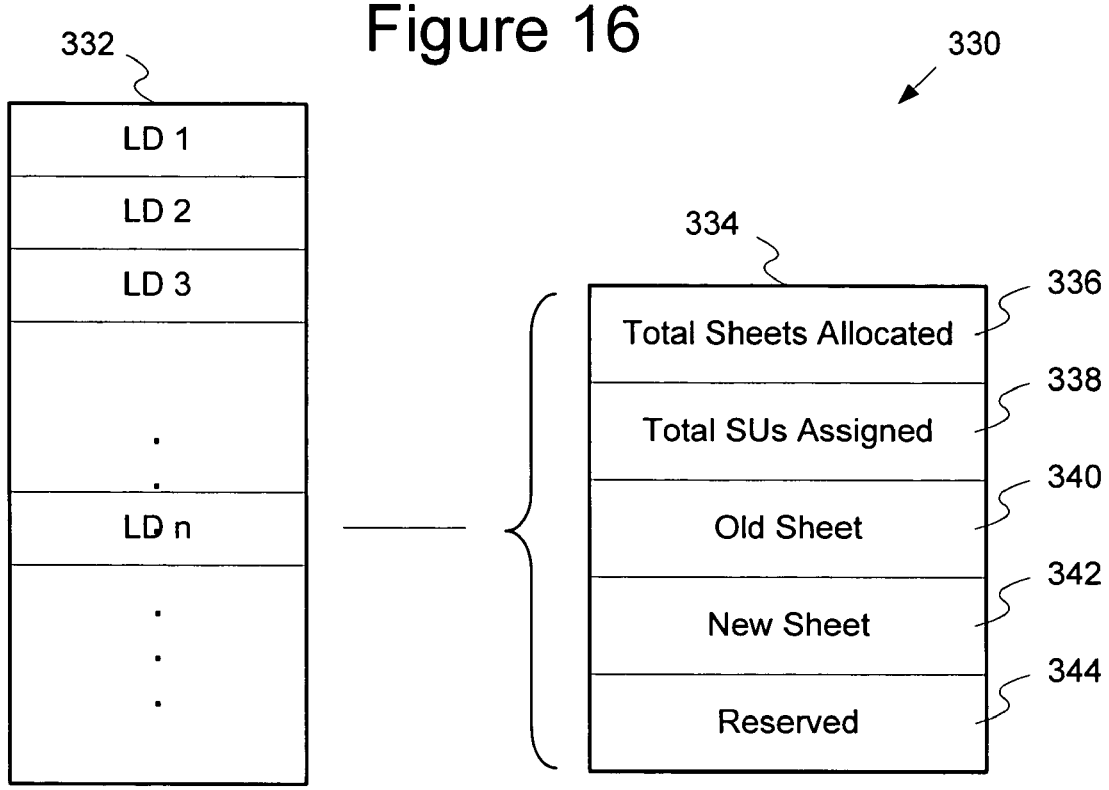
FIG. 16 is a diagrammatical depiction of a reliable storage unit allocation descriptor array.

FIG. 16 further depicts metadata of the present embodiments in the form of an SU allocation descriptor array 330 that provides an array 332 that is indexable by LD. Each SU allocation descriptor entry 334 comprises the total number of sheets allocated 336 to the LD, the total number of SUs 185 allocated to the LD, an old sheet pointer 340, a new sheet pointer 342, and reserved bits 344. The old sheet pointer 340 and new sheet pointer 342 can be employed to remap LDs across additional books when additional storage capacity is available. The allocation process can employ multiple book allocation where a first sheet allocated to an LD is from a first book and a second sheet allocated to the LD is from a second book, and so on. The starting book for a first allocated sheet for an LD can be determined from the LD number modulo the number of books.

Figure 17:
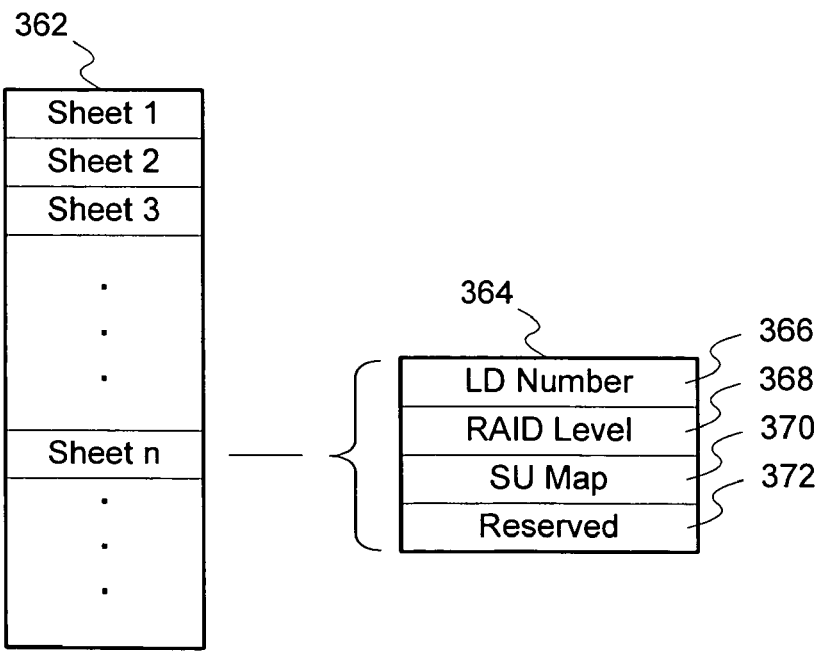
FIG. 17 is a diagrammatical depiction of a sheet allocation table.

FIG. 17 further depicts metadata of the present embodiments in the form of a sheet allocation table (SHAT) 360 that is an indexable array 362 of data about every sheet in the storage capacity. A SHAT entry 364 comprises the LD number 366 to which the respective sheet is allocated, the RAID level 368 of the sheet, an SU map 370 having bits indicating which SUs 185 in the sheet are allocated to the logical device and which SUs 185 are allocatable, and can include reserved bits 372. The RAID level 368 can include values to indicate that a conversion from one RAID level to another RAID level is in progress. The SHAT 360 can be established in memory when the LD maps are instantiated. The SHAT 360 is updated as sheets and SUs 185 are allocated to or de-allocated from an LD. The SHAT 360 can serve as an efficient resource in determining whether sufficient allocatable SUs 185 exist within a particular LD in response to an allocation request to the LD. The SHAT 360 can further serve as a metadata check for the possibility of multiple allocated (misallocated) sheets and SUs 185 during map instantiation, and can provide extra cross-checking during sheet and SU 185 allocation and de-allocation. The SHAT 360 can also provide accounting for straightforward garbage collection of partially allocated sheets in LDs, left as the result of operations like RAID level transformations and sparse de-allocations.

Figure 18:
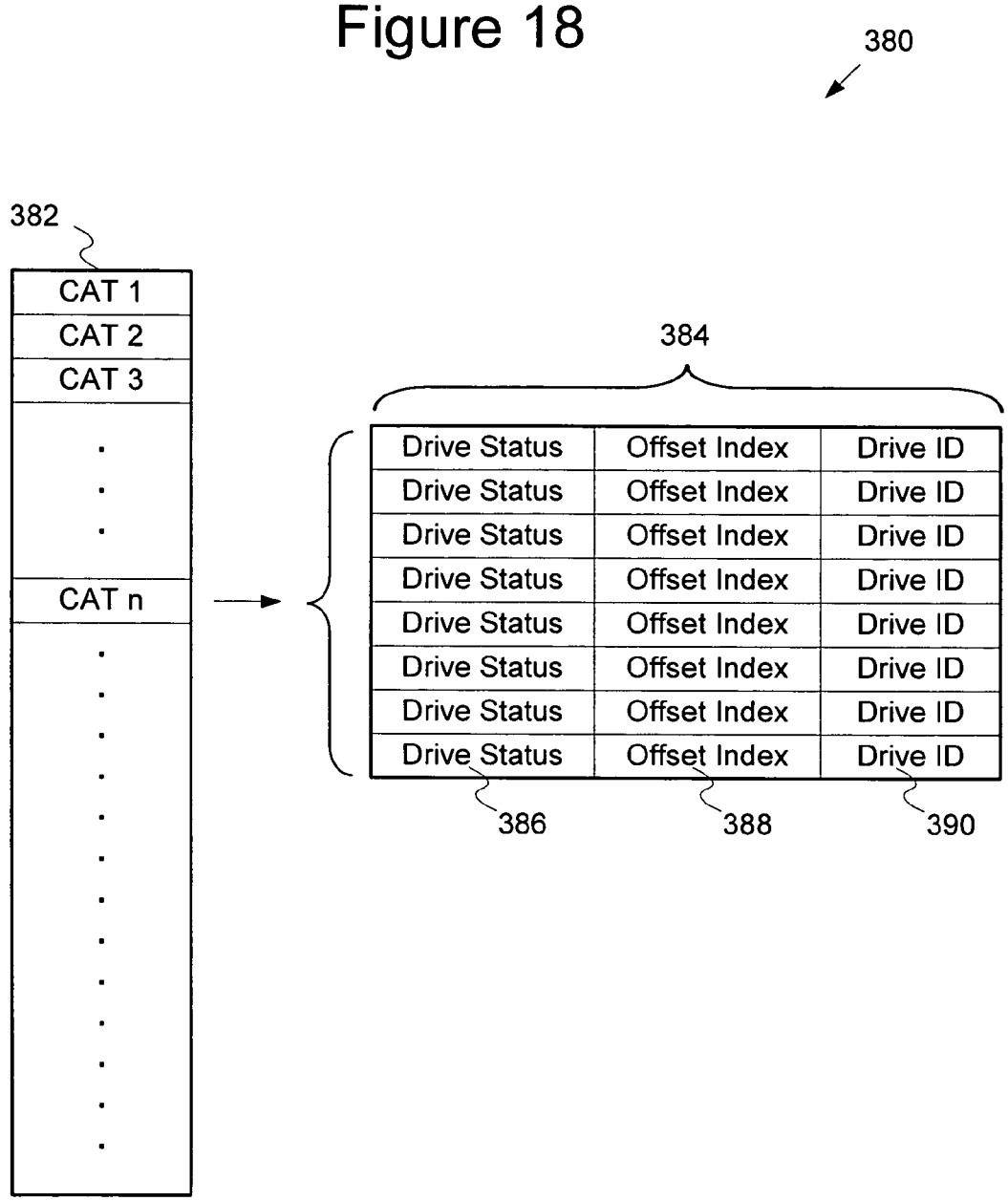
FIG. 18 is a diagrammatical depiction of a drive organization table.

FIG. 18 further depicts metadata of the present embodiments in the form of a drive organization table (DOT) 380 providing an indexable array 382 of current array table (CAT) entries 384. The number of CATs 384 in DOT 380 reflects the number of books, the number of drive organizations 304 (FIG. 14) and the number of sheet versions 172 (FIG. 6). Each CAT 384 specifies the ordered set of data storage devices 101 providing stripes 132 to the sheet. In the illustrative embodiments of FIG. 18 there are eight data storage devices 101 specified by the CAT entry 384, as might be associated with the SU 185 in FIG. 10. Each CAT entry 384 comprises drive status 386, offset index 388, and drive ID 390.

Drive status 386 comprises drive condition information, including information from reporting technology (SMART). SMART is an industry adopted standardized specification for failure warnings. SMART is based on monitoring for excessive internal data storage device 101 errors, such as bit-read errors and track-seek errors. SMART employs a failure-warning algorithm running in a data storage device's 101 microprocessor that checks whether error rates exceed a threshold value, and if such condition exists, sends a warning over the data storage device interface 122 to the host 102.

Offset index 388 can be applied to an LBA offset table to skip areas of a data storage device 101 or offset the areas accessed. The offset index 388 accesses a table to obtain the starting LBA of the partition on the particular data storage device 101. That partition is the entire contribution of data capacity from the given data storage device 101 to the respective book. Books are formed from partitions of consecutive LBAs. As noted earlier, the number of CATs 384 in the DOT 382 reflects the number of books, the number of drive organizations 304, and the number of sheet versions 172. If a data storage device 101 fails, is removed, or is otherwise out of service, it can be functionally replaced by a spare data storage device 101 designated as containing spare stripes 132. Table 2 below illustrates CAT entry 384 values corresponding to sheet version 5 (SV5) in FIG. 6. Drive status 386 is shown as a value of zero, indicating no problems; however other values and representations of drive status 386 can be employed. Drive ID 390 is shown as a letter value corresponding with the data storage device 101 denotation in FIG. 6.

TABLE 2

| Drive Status | Offset Index | Drive ID |
|---|---|---|
| 0 | 0 | C |
| 0 | 0 | E |
| 0 | 0 | G |
| 0 | 0 | I |
| 0 | 0 | D |
| 0 | 0 | F |
| 0 | 0 | H |
| 0 | 0 | J |

Table 3 below depicts the CAT 384 for sheet version 5 after data storage device 'E' has failed, has been removed or is otherwise out of service. From FIG. 6 it will be recognized that drives A and B serve as spares for sheet version 5 (SV5). Spares can be selected relative to group 174, 176, such that drive A is selected to replace drive E.

The CAT 384 is a different drive organization that is referenced from the SU descriptor 290 after the data in the SU 185 has been rearranged to conform to the new organization. Prior to the change, the SU descriptor 290 references a CAT 384 that is modified to indicate the failed drive is missing. After the change, the SU descriptor 290 is modified to reference this new CAT 384.

TABLE 3

| Drive Status | Offset Index | Drive ID |
|---|---|---|
| 0 | 0 | C |
| 0 | 0 | A |
| 0 | 0 | G |
| 0 | 0 | I |
| 0 | 0 | D |
| 0 | 0 | F |
| 0 | 0 | H |
| 0 | 0 | J |

The CAT 384 shown in Table 3 can be stored as another indexable entry 382 in DOT 380, such as CAT 10, for example. Since drive E also affects three other sheet versions 172, additional CATs 384 can be created to reflect sparing in SV1, SV2, and SV4. Data in SUs 185 employing drive E can be copied or reconstructed and stored to the spare data storage device 101 designated in the sheet version 172 of FIG. 4. Prior to copying or reconstructing data, the drive organization 304 can specify a CAT 384 prior to sparing. After copying or reconstruction, or the drive organization 304 can specify a CAT 384 after sparing. Allocation of SUs 185 after a data storage device 101 failure would employ a new drive organization 304. The drive organization 304 can be updated following replacement of a failed or removed data storage device 101. CAT 384 values for the DOT 380 can be illustrated for the sheet organization table 160 of FIG. 4 as shown in Table 4:

TABLE 4

| | Drive Org 1 | Drive Org 2 | Drive Org 3 |
|---|---|---|---|
| Sheet Version 1 | 0123 5678 49 | 0124 5678 359 | 0129 5678 3̶4̶ |
| Sheet Version 2 | 0124 5679 38 | 0124 5679 358 | 0128 5679 3̶4̶ |
| Sheet Version 3 | 0134 5689 27 | 0124 5689 357 | 0127 5689 3̶3̶4̶ |
| Sheet Version 4 | 0234 5789 16 | 0214 5789 356 | 0216 5789 3̶3̶4̶ |
| Sheet Version 5 | 1234 6789 05 | 1204 6789 355 | 1205 6789 3̶4̶ |

The numbers 0-9 represent the ordering of data storage devices 101 providing stripes 132 for each sheet version 172, listed as four numbers representing the first group 174, four numbers representing the second group 176, and two numbers indicating the spare data storage devices 101. Drive organization 2 (Drive Org 2) in table 4 depicts a drive organization 304 that can be implemented if data storage device 3 fails. In sheet version 1, Drive Org 2, data storage device 4 has taken the place of data storage device 3 in group 1, and data storage device 3 is shown with a strikethrough to indicate failure (or inaccessibility). Furthermore, in sheet version 1, Drive Org 3, data storage device 9 replaces failed data storage device 4. Table 4 furthermore illustrates various drive reorganization schemes for SV2, SV3 and SV4 where the same data storage devices 101 are involved.

As noted previously, the letters depicted in FIG. 6 and in the above charts indicate the participation of data storage devices 101 in a book. The combination of book ID 302 and relative drive position from a CAT 384 can be combined to form a member storage pool ordinal tag (MSPOT) that is used to access another table, such as one that provides a fibre channel arbitrated loop physical address (ALPA), to get the physical drive address. In some embodiments, the MSPOT can be produced by multiplying the book ID 302 by a number greater than or equal to the maximum number of data storage devices 101 in a book (such as sixteen in a ten data storage device 101 system, for example) and then adding the CAT 384 value specifying the member index of the data storage devices 101 providing storage capacity to the SU 185 to produce an index in a system table. Depending on the type of data storage devices 101 employed, tables can be configured to contain SCSI IDs, fibre channel IDs, or any other addresses or IDs to physically address data storage devices 101. Alternatively, and as noted earlier, the drive letters in the CAT 384 can correspond to the drive IDs 390 such as ALPAs or SCSI IDs, for example, such that an MSPOT table and MSPOT/physical drive address tables are not used.

As illustrated above, embodiments of the present invention provide a metadata structure that easily accommodates removal, failure, or addition of data storage devices 101. Additionally, the drive organizations 304 specified in the SU descriptor entry 290 simplifies management of SUs 185. For example, if a data storage device 101 has been removed, has failed, or is otherwise out of service, a second drive organization 304 can be defined. If new SUs 185 are allocated to an LD after a data storage device 101 failure, the next successive drive organization 304 can be specified in the SU descriptor 290. For previously allocated SUs 185, data can be reconstructed and the drive organization 304 changed from a first value to a second value. As such, the drive organization 304 provides an indicator of which existing SUs 185 have been reconstructed, and can allow allocation to continue following data storage device 101 removal or failure. Restated, the drive organization 304 embodiments of the present invention allow accommodation of various failure permutations through a single high-level structure.

Figure 19:
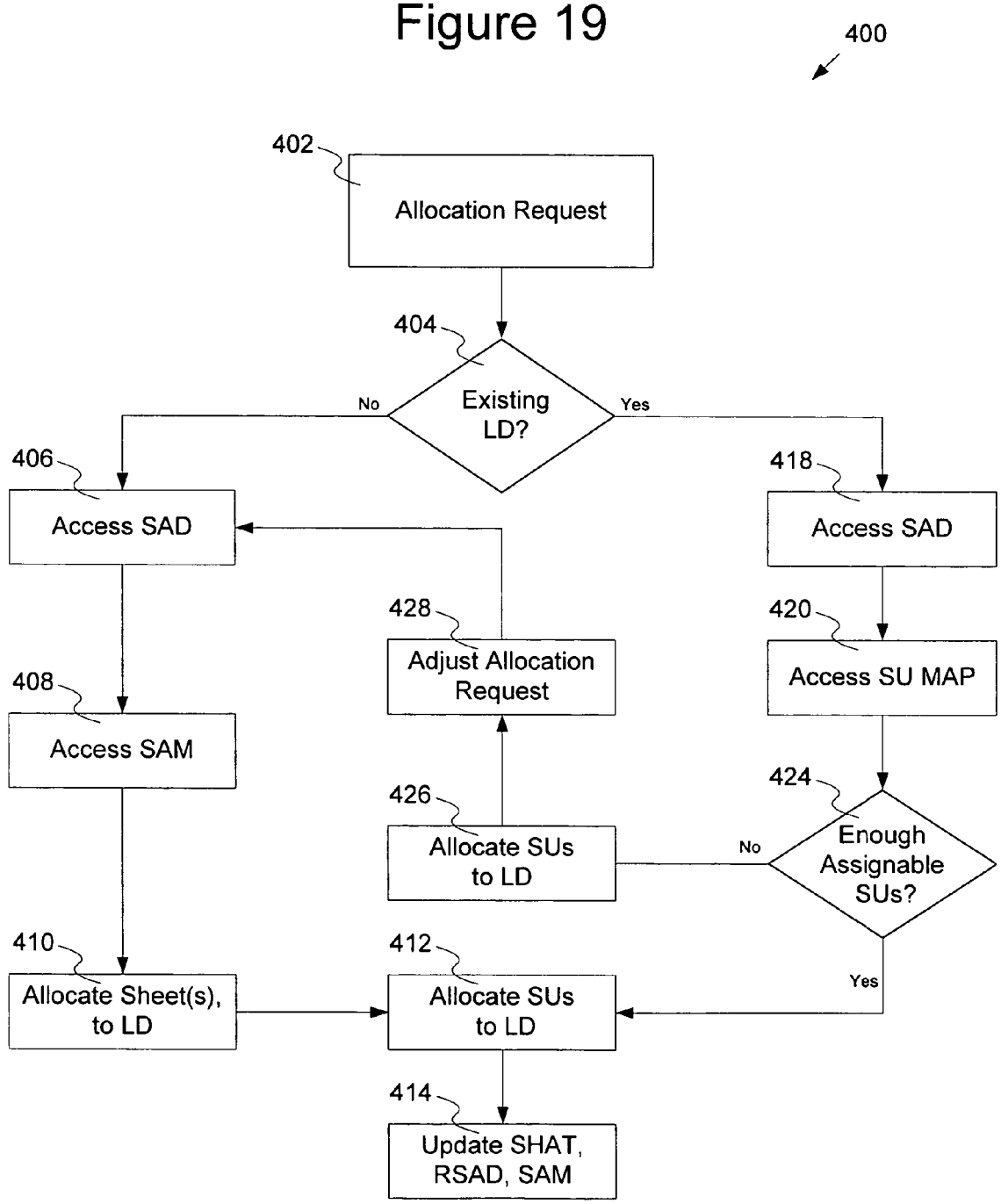
FIG. 19 is a process flowchart illustrating steps for ALLOCATING STORAGE CAPACITY in accordance with embodiments of the present invention.

FIG. 19 illustrates steps for practicing a METHOD OF ALLOCATING STORAGE CAPACITY 400 in accordance with embodiments of the present invention. The method 400 begins with an allocation request 402 from the system 100C for allocating storage capacity. Preferably, the allocation request 402 is associated with an LD number, a RAID level, and a storage capacity. Storage capacity can be converted to a number of SUs 185. The number of sheets to be allocated can be determined by dividing the number of SUs 185 in the allocation request by the number of SUs 185 per sheet for the specified RAID level.

Decision block 404 determines whether the LD of the allocation request 402 is associated with an existing LD. If the determination of block 404 is no, then control passes to block 406 where the SAD 260 for the book is accessed and storage capacity containing allocatable sheets is identified. In block 408 the SAM 240 is accessed to select one or more individual sheets.

Control then passes to block 410 where the sheets are allocated to the LD. A book for the first sheet allocated to a new LD can be determined from the LD number. For example, the book can be calculated as the LD number modulo number of books. If multiple sheets are allocated, the sheets can be selected from different books, such as round-robin or circular table methods. The drive organization 304 for newly allocated SUs 185 is the latest defined for that particular book. The drive organization 304, book ID 302, RAID level 300, and SU number 298 are stored as SU descriptor entries 288. If the data storage devices 101 in the book are of a large capacity, the additional SU 185 number bits can be stored as extended SU descriptor entries 292. SU descriptor array entries 284 are then stored in the LDAM 280, either at an offset corresponding to the LD for a flat array arrangement, or at another location for which the index is then stored in the LDAM 280 for indexed array arrangements.

In block 412 the SUs 185 are allocated to the LD, and in block 414 the SAD 260 and SAM 240 are updated to reflect completion of the allocation request 402.

If the determination of decision block 404 is yes, then control passes to block 418 where the SAD 330 is accessed in order to query the last SU 185 allocated to the LD associated with the allocation request 402, along with the respective sheet number in which that SU 185 resides. Control then passes to block 420 where the sheet number is used to query the SU map 370 within New Sheet 342 of the SU array descriptor 330. Control then passes to decision block 424 where it is determined whether there are enough allocatable SUs 185 in the sheet allocated to the LD to satisfy the allocation request 402. If the determination of decision block 424 is no, then any allocatable SUs are allocated to the LD in block 426, the allocation request 402 is adjusted in block 428 to reflect the number of allocatable SUs 185 that were allocated to the LD in block 426, and then control passes to block 406. Processing then continues as described above. If the determination of decision block 424 is yes, then the SUs 185 are allocated to the LD in block 412 and the SHAT 360 is updated in block 414.

If the number of SUs 185 being allocated exceeds the number of allocatable SUs 185 in one sheet, additional sheets are allocated, either from the same book or from different books. When an LD is expanded (SUs 185 added to an existing LD), the SU array descriptor 330 is accessed to determine whether enough allocatable SUs 185 exist in an already allocated sheet, or whether a new sheet must be allocated. The book containing the additional sheets can be determined from the LD number and the number of sheets already allocated to that LD, as is indicated by the SU array descriptor 330. Through allocation of SUs 185 to LDs, LBAs of stripes 132 are virtualized as VBAs within each LD. Data can then be stored, or stored data can be read, with reference to the LD and VBA.

Figure 20:
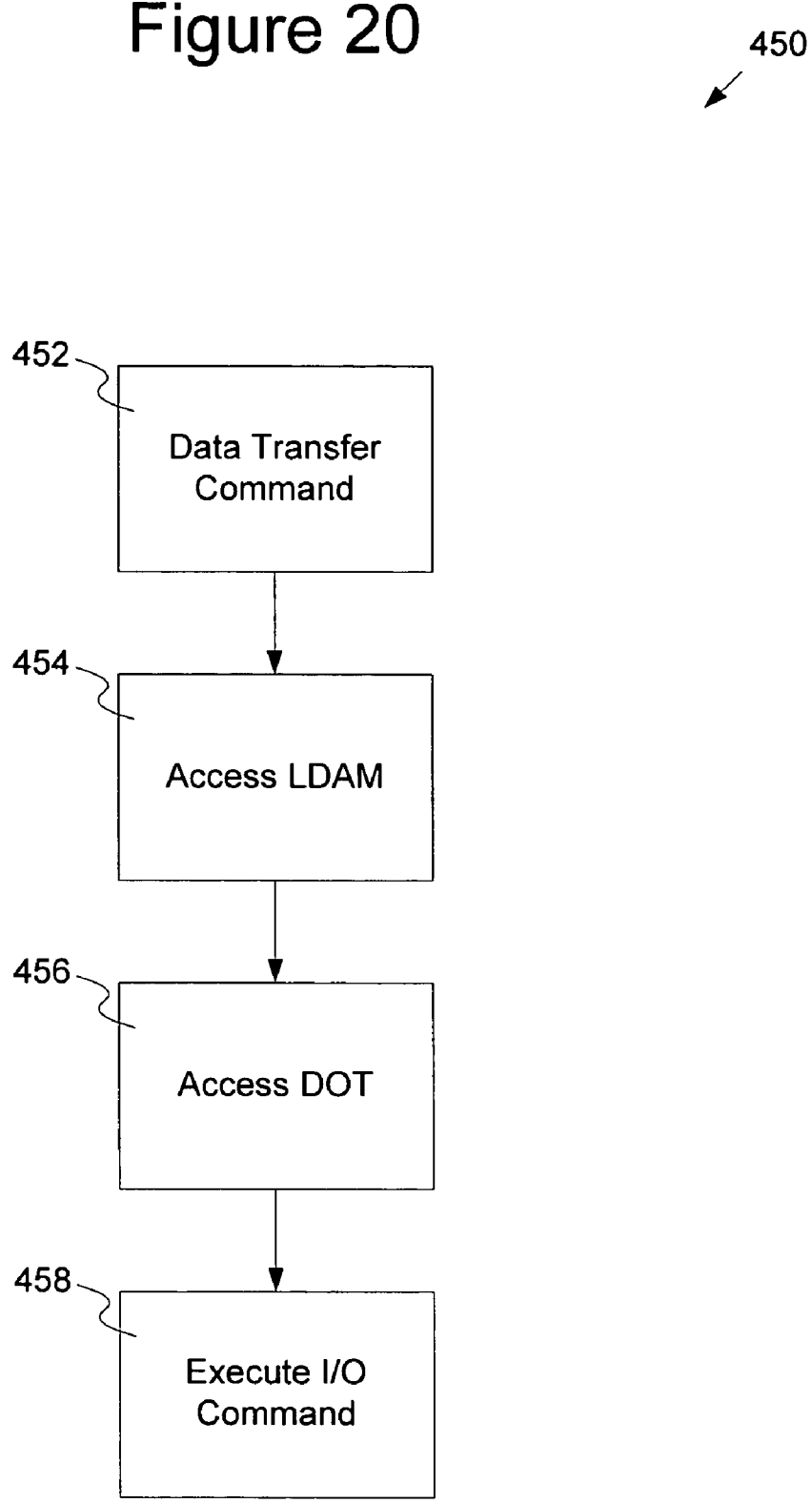
FIG. 20 is a process flowchart illustrating steps for TRANSFERRING DATA in accordance with embodiments of the present invention.

FIG. 20 illustrates steps for practicing a METHOD OF TRANSFERRING DATA 450 in accordance with embodiments of the present invention. The method 450 utilizes the metadata architecture in storing data to or reading data from the storage capacity. The method 450 begins with an input/output (I/O) request in block 452 that specifies an LD, at least one VBA, and an I/O operation, such as a data read or write operation.

Control then passes to block 454 where the LDAM 280 is accessed in order to index the SU descriptor array 284 for the entries 288 allocated to the LD associated with the data transfer request 452. The entries 288 are then parsed with respect to the VBA in order to determine the SU descriptor 290, which identifies the field 296 containing, among other information, the drive organization 304, book ID 302, and SU number 298. It will be recalled from above that the sheet version 172 (FIG. 6) of the sheet containing the desired SU 185 can be determined by dividing the SU number 298 by the number of SUs 185 in a sheet (such as by 30 in the example of FIG. 11) then dividing the result by the number of sheet organization versions (such as 5 in the example of FIG. 6) with the remainder being the sheet version.

Control then passes to block 456 where the DOT 380 is accessed to parse the indexable array 382 according to the drive organization 304, book ID 302, and sheet version 172 in order to determine the CAT 384 associated with the desired SU 185. The book ID 302 and the relative member positions obtained from the selected CAT 384 can be combined to form an MSPOT. The MSPOT can be applied to an MSPOT/ALPA table or similar structure, as previously described, to obtain individual drive addresses. The SU number 298 can be used directly to indicate the drive address, or it can be scaled, masked, offset and otherwise adjusted to produce a data LBA. The data LBA can also be modified by an offset specified by the offset index 388 of the CAT 384. Additionally, the offset index 388 can be applied to an offset table to obtain a specific offset value for each data storage device 101. Alternatively, a single table that combines the DOT 380, CAT 384, MSPOT and MSPOT/ALPA arrays can be employed. Finally, in block 458 the data transfer command is executed.

Disc-based metadata of embodiments of the present invention can be allocated sheets and SUs 185 in a manner similar to that of user data. A highly reliable data storage format, such as RAID-1×3, for example, can be employed to store disc-based metadata.

The illustrative embodiments of FIGS. 13-18 depict metadata structures that can be stored on the data storage devices 101 to manage a grid based storage system 100C. In addition to data storage device 101 based metadata, metadata structures can be implemented in memory, preferably non-volatile memory, to manage the storage system 100C.

From the foregoing description it will be noted that the allocation/access metadata structures of the present invention deal only with user data grids 202 and are not encumbered with handling of mirror or parity data grids 204, 206. That is, the allocation of a user data grid 202 implicitly causes allocation of the associated mirror or parity data grids 204, 206. This provides increased efficiency and higher performance. Handling of mirror or parity data can be performed in a manner transparent to allocation and access processes, and can employ computer program code, tables, or other structures that reflect data and parity mapping.

Various structures described herein can be combined within the embodiments of the present invention. For example, SU descriptor array entries 288 and Rbit entries 287 of the LDAM 280 can be implemented as separate arrays, can be implemented as a single array, or can be combined for each SU 185 and indexed or linked. As a further example, SU allocation descriptor entries 334 can be implemented as a part of the pointer pairs 282 of the LDAM 280 and indexed to each LD. Other data structures can be similarly combined within the embodiments of the present invention.

The foregoing description of the embodiments of the present invention has been presented for purposes of illustration and description. It is not intended to be exhaustive or to limit the embodiments of the invention to the precise form disclosed, and other modifications and variations are possible in light of the above teachings. The illustrative combinations and utilizations of metadata architectures provide the necessary functionality such that an enumeration of all possible arrangements is not necessary to the skilled artisan in order to understand the scope of the embodiments of the present invention. The embodiments chosen and described explain the principles of the invention and its practical application to thereby enable the skilled artisan to utilize the invention in various embodiments and various modifications as are suited to the particular use contemplated. The appended claims can be construed to include other alternative embodiments of the present invention.

What is claimed is:

1. An apparatus comprising:
   a grouping of stripes of storage capacity across a plurality of storage domains, wherein same-size groupings define respective sheets of data storage capacity; and
   a data structure, stored in a computer readable medium, that includes a table of values indexed by a sheet identifier, the data structure reflecting data transaction activity by identifying whether each of the respective sheets is allocated.

2. The apparatus of claim 1 wherein the data structure comprises a sheet allocation map characterized by a bit array indicating whether each of the sheets is allocatable.

3. The apparatus of claim 2 wherein the data structure comprises a sheet allocation descriptor indicating the number of allocatable sheets.

4. The apparatus of claim 3 wherein the sheets are arranged into a plurality of zones, and wherein the sheet allocation descriptor indicates the number of allocatable sheets per zone.

5. The apparatus of claim 1 wherein the data structure comprises a storage unit descriptor identifying a reference logical block address for a selected grouping.

6. The apparatus of claim 5 wherein the storage unit descriptor comprises a book identification that identifies storage domains for a selected grouping.

7. The apparatus of claim 6 wherein the storage unit descriptor comprises a unique storage unit number for each grouping in a selected book.

8. The apparatus of claim 5 wherein the storage unit descriptor comprises fault tolerance information.

9. The apparatus of claim 8 wherein the fault tolerance information comprises a drive organization indicator defining an ordered scheme of implementing spare storage domains.

10. The apparatus of claim 9 wherein a sheet version defines which storage domains are designated as spares, and wherein the data structure comprises a drive organization table characterized as an array of all permutations of book identifications, drive organizations, and sheet versions.

11. The apparatus of claim 8 wherein the fault tolerance information comprises a redundant array of independent drives (RAID) level.

12. The apparatus of claim 5 wherein the data structure comprises a logical device allocation map characterized by an array of storage unit descriptors for each logical device in the array.

13. The apparatus of claim 12 wherein the data structure comprises a storage unit allocation descriptor characterized by an array of logical device indices indicating the number of sheets allocated to each of the logical devices.

14. The apparatus of claim 13 wherein the storage unit allocation descriptor indicates the number of groupings allocated to each of the logical devices.

15. The apparatus of claim 12 wherein the data structure comprises a sheet allocation table characterized by an array of sheet indices indicating the logical device to which each sheet is allocated.

16. The apparatus of claim 15 wherein the sheet allocation table comprises fault tolerance information.

17. A data structure stored in a computer readable medium for a data storage system employing a grid-based storage capacity defining a storage unit in terms of a plurality of storage domains against one or more rows of a plurality of storage stripes, and groupings of two or more storage units defining respective sheets of data storage capacity arranged in a plurality of zones, the data structure comprising a sheet allocation map, characterized as a bit array associated with whether each of the sheets is allocatable, and a sheet allocation descriptor summarizing the sheet allocation map in terms of a number of allocatable sheets and a number of allocatable sheets per zone.

18. A data structure stored in a computer readable medium for a data storage system employing a grid-based storage capacity defining a storage unit in terms of a plurality of storage domains against one or more rows of a plurality of storage stripes, and groupings of two or more storage units defining respective sheets of data storage capacity, the data structure comprising indicia that identify whether each of the respective sheets of storage capacity are allocated in its entirety, and a storage unit descriptor that, for a selected storage unit, identifies: (a) a reference logical block address, (b) a book identification defining contributing storage domains of the plurality, (c) a unique storage unit number with respect to storage units in the same book, and (d) a redundant array of independent drives (RAID) level.

19. A data structure stored in a computer readable medium for a data storage system employing a grid-based storage capacity defining a storage unit in terms of a plurality of storage domains against one or more rows of a plurality of storage stripes, and groupings of two or more storage units defining respective sheets of data storage capacity, the data structure comprising:

indicia that identify whether each of the respective sheets of storage capacity are allocated in its entirety;

a storage unit descriptor that, for a selected storage unit, identifies: (a) a reference logical block address, (b) a book identification defining contributing storage domains of the plurality, (c) a unique storage unit number with respect to storage units in the same book, and (d) a drive organization defining an ordered scheme of implementing spare storage domains; and a drive organization table characterized by all permutations of book identifications, drive organizations, and sheet versions defining which storage domains are designated as spares.

20. A method comprising:

receiving an allocation request in a grid-based storage system in which a storage unit is defined by rows of a plurality of stripes of storage capacity across a plurality of storage domains, wherein groupings of same-size storage units define respective sheets of data storage capacity; and indexing a data structure, stored in memory, according to a sheet identifier to determine an allocation status of the respective sheet.

\* \* \* \* \*